US006896820B2

(12) United States Patent
Mattox

(10) Patent No.: US 6,896,820 B2
(45) Date of Patent: May 24, 2005

(54) DEBRIS REMOVAL SYSTEM

(75) Inventor: James R. Mattox, Rockford, IL (US)

(73) Assignee: Enviro-Care Company, Inc., Rockford, IL (US)

( * ) Notice: Subject to any disclaimer, the term of this patent is extended or adjusted under 35 U.S.C. 154(b) by 0 days.

(21) Appl. No.: 10/674,603

(22) Filed: Sep. 29, 2003

(65) Prior Publication Data

US 2004/0112845 A1 Jun. 17, 2004

Related U.S. Application Data

(60) Provisional application No. 60/414,112, filed on Sep. 28, 2002.

(51) Int. Cl.[7] .............................................. B01D 29/64
(52) U.S. Cl. ........................ 210/791; 210/112; 210/159; 210/162; 210/413
(58) Field of Search ................................ 210/791, 158, 210/159, 162, 107, 112, 408, 413

(56) References Cited

U.S. PATENT DOCUMENTS

| 973,697 | A |   | 10/1910 | Potts |
|---|---|---|---|---|
| 1,823,823 | A | * | 9/1931 | Dundas et al. .............. 210/159 |
| 2,102,570 | A |   | 12/1937 | Lind |
| 2,128,347 | A |   | 8/1938 | Briggs |
| 2,634,863 | A |   | 4/1953 | Hauer |
| 2,899,062 | A |   | 8/1959 | Heacock |
| 2,904,181 | A | * | 9/1959 | Baker et al ................. 210/159 |
| 3,190,448 | A |   | 6/1965 | Johnston et al. |
| 3,549,028 | A | * | 12/1970 | Neumann et al. ........... 210/159 |
| 3,836,463 | A |   | 9/1974 | Teague et al. |
| 3,856,216 | A |   | 12/1974 | Teague et al. |
| 3,909,411 | A |   | 9/1975 | Angele et al. |
| 4,184,957 | A |   | 1/1980 | Botsch |
| 4,214,989 | A |   | 7/1980 | Rudolph et al. |
| 4,447,323 | A | * | 5/1984 | Jackson ...................... 210/158 |
| 4,561,975 | A |   | 12/1985 | Schloss, Jr. |
| 4,792,394 | A |   | 12/1988 | Rudzinski |
| 4,917,796 | A |   | 4/1990 | Rudzinski |
| 5,032,263 | A |   | 7/1991 | Rudzinski |
| 5,098,564 | A |   | 3/1992 | Miller et al. |
| 5,565,093 | A |   | 10/1996 | Frankenberger |
| 5,718,771 | A | * | 2/1998 | Cassell et al. .............. 210/162 |
| 5,901,857 | A |   | 5/1999 | Schurman |
| 5,975,443 | A |   | 11/1999 | Hundt et al. |
| 6,006,922 | A |   | 12/1999 | Bielagus |
| 6,010,013 | A |   | 1/2000 | Brauch et al. |
| 6,016,920 | A |   | 1/2000 | Brauch et al. |

FOREIGN PATENT DOCUMENTS

| DE | 272029 |   | 3/1914 |
|---|---|---|---|
| FR | 2492865 | * | 4/1982 |

* cited by examiner

Primary Examiner—Christopher Upton
(74) Attorney, Agent, or Firm—DuFault Law Firm

(57) ABSTRACT

An automatic screening apparatus for removing debris from a liquid stream includes a drive mechanism mounted to a support frame. A screen connects to the support frame and collects debris while allowing the liquid to flow through. The drive mechanism positions and interchangeably couples to a first carriage assembly and a second carriage assembly. The first carriage assembly includes a rake that removes the collected debris from the screen. The second carriage assembly includes a bucket that removes the debris collected from the rake. A plunger directs the debris from the rake into the bucket. At selected intervals, the drive mechanism decouples from the first carriage assembly and couples to the second carriage assembly, whereupon the second carriage assembly is positioned to dump the bucket. After dumping the bucket, the drive shaft is decoupled from the second carriage assembly and coupled to the first carriage assembly, whereupon the cycle is repeated.

18 Claims, 10 Drawing Sheets

DEBRIS REMOVAL SYSTEM

CROSS-REFERENCE TO RELATED APPLICATION(S)

This application is a Non-Provisional Application claiming the benefit of U.S. Provisional Application No. 60/414,112 filed on Sep. 28, 2002.

BACKGROUND OF THE INVENTION

The present invention generally relates to an apparatus for intercepting and removing debris and trash moved within a liquid stream. In particular, the present invention relates to a self-relieving screening apparatus for intercepting debris and trash flowing through a conduit, pipe, channel, tank or well, and automatically elevating the intercepted trash and debris to a receptacle or conveying system.

There exists in the art many examples of self-relieving screening apparatuses for liquids, particularly for waste streams. Such apparatuses typically include complex mechanical drive systems such as cable and pulley systems, chain and sprocket systems, rack and pinion systems, or manual systems of similar design. The complexity of these mechanical drive systems typically involve many moving parts subject to wear and tear, which can lead to high maintenance costs. Also, because self-relieving screening apparatuses are generally located in an unmanned environment, reliability is essential. Reliability is questionable in apparatuses that include drive parts located near or within the waste stream because they tend to malfunction by becoming contaminated, corroded or jammed.

SUMMARY OF THE INVENTION

An automatic, self-relieving apparatus filters trash and debris from incoming liquid, typically sewage or storm water, flowing in a conduit, pipe or channel. The apparatus utilizes a bar screen and automatic rake in conjunction with a traveling dump bucket to remove the collected trash or debris. The bar screen is positioned within the flow of the liquid such that the debris collects upon the bar screen. At selected intervals, the rake engages the screen to lift and remove the debris. The rake is positionable via a ball screw drive mechanism. Upon the rake collecting and lifting the debris from the bar screen, a plunger directs and compresses the lifted debris into the dump bucket, which is parked at a level above the inflowing stream of liquid. Upon obtaining a selected amount of debris, a transfer mechanism disengages from the rake and engages the dump bucket, whereupon the dump bucket is lifted via the same ball screw drive mechanism to a predetermined dump height. At the predetermined height, the dump bucket is rotated up to 160 degrees to dump the debris. Upon dumping the debris, the ball screw drive is reversed and the dump bucket is returned whereupon the transfer mechanism disengages from the bucket and once again engages to the rake. The operation may then be repeated.

DETAILED DESCRIPTION

Figure 1:
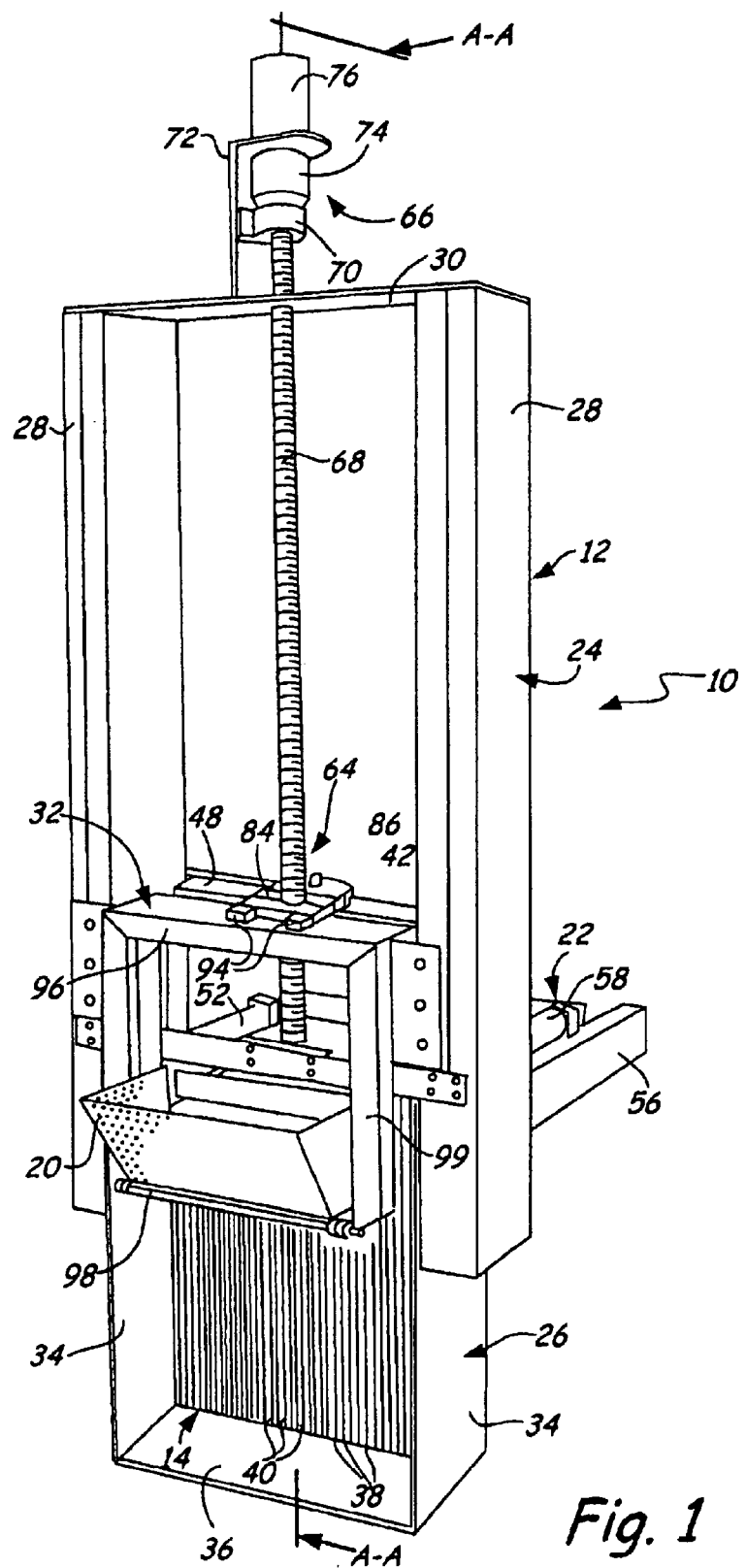
FIG. 1 is a perspective view of a debris removal system of the present invention.

A debris removal system of the present invention is generally indicated at 10 in FIG. 1. The debris removal system 10 generally comprises a support frame structure 12, a bar screen 14 for the containment of debris 16, a reciprocating rake 18 to clean the bar screen 14, a bucket 20 for transporting the debris 16 to a separate system 100, and a plunging apparatus 22 to direct the debris from the rake 18 into the dump bucket 20. The bar screen 14 and the rake 18 are similar to those fully described in U.S. Pat. No. 4,792,394 entitled "Bar Screen Apparatus," U.S. Pat. No. 4,917,796 entitled "Lift with Automated Dump" and U.S. Pat. No. 5,032,263 entitled "Bar Screen and Rake Apparatus," all issued to Rudzinski and commonly assigned to Applicant, all of which are hereby incorporated herein by reference.

The frame structure 12 includes an upper portion 24 and a lower portion 26. The upper portion 24 includes first and second channel members 28, spaced apart and connected by an upper cross member 30. Disposed upon and between each channel member 28 is the plunging apparatus 22, a rake carriage 42 for positioning the rake 18 and a dump carriage 32 for transporting the dump bucket 20. The lower portion 26 of the frame 12 includes first and second support members 34, spaced apart and connected at terminal ends by a lower cross member 36. Opposing ends of the first and second support members 34 attach to the channel members 28. The lower portion 26 of the frame structure 12 is generally submerged within the flowing stream when positioned within the conduit, pipe or channel. Preferably, and for the most part, the upper portion 24 is not submerged, nor is the upper portion 24 in constant direct contact with the stream to be cleaned. In so doing, all moving parts, with the exception of the rake 18, are located above water level which reduces corrosion.

Disposed between the first and second support members 34 is the bar screen 14. The bar screen 14 consists of a plurality of flat bars 38 disposed in closely-spaced parallel relation for defining a plurality of narrow, elongated flow openings 40 therebetween. The bars 38 may be positioned between zero to forty-five degrees relative to the direction of the flow stream. A dead plate 41 is mounted between the channel members 28 immediately above the screen 14 for the purpose of preventing solids from dropping on the downstream side of the screen 14 during the raking and removal process.

Figure 2:
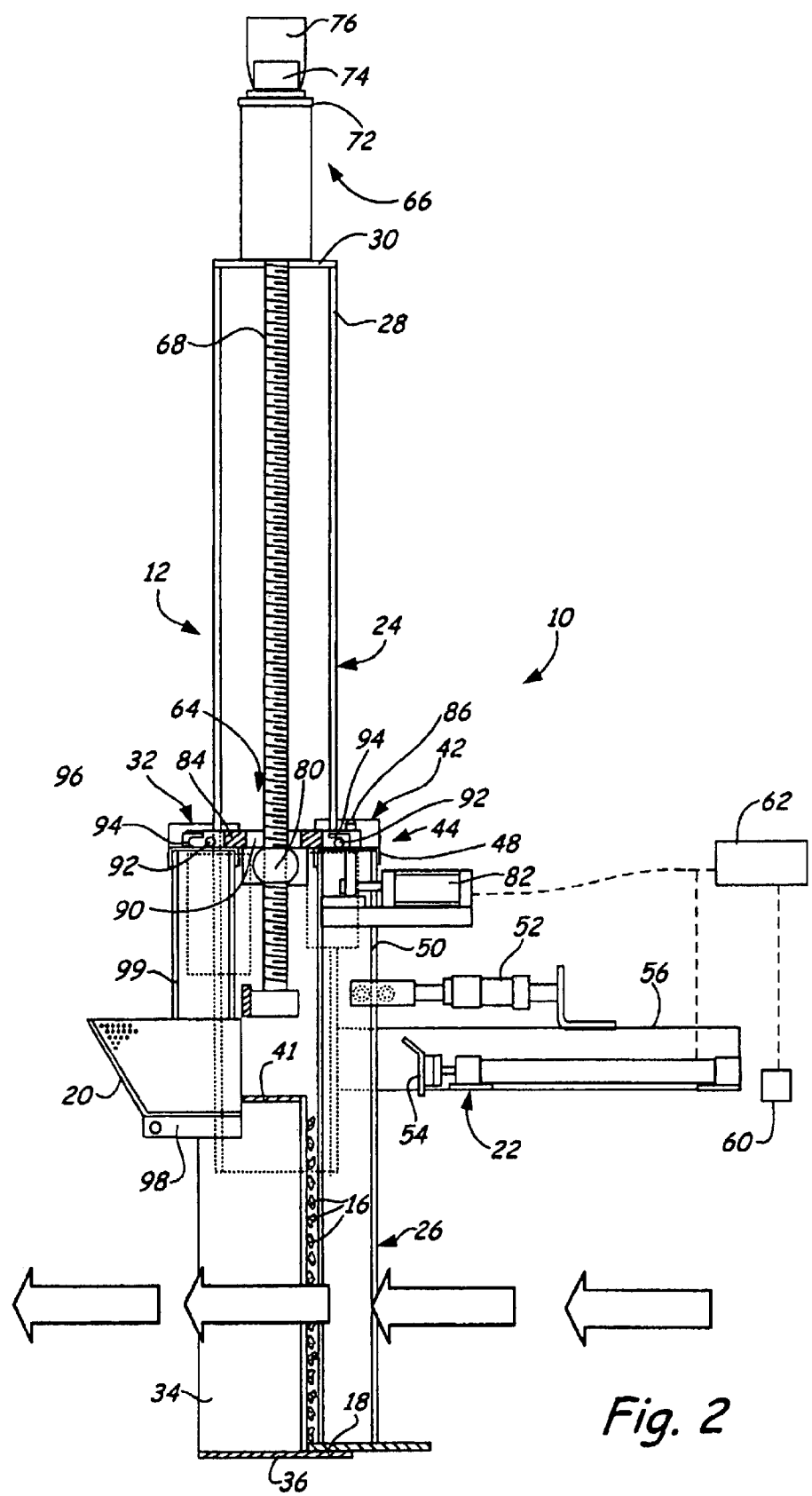
FIG. 2 is a cross-sectional view of the debris removal system of the present invention taken along lines A—A in FIG. 1.
Figure 3:
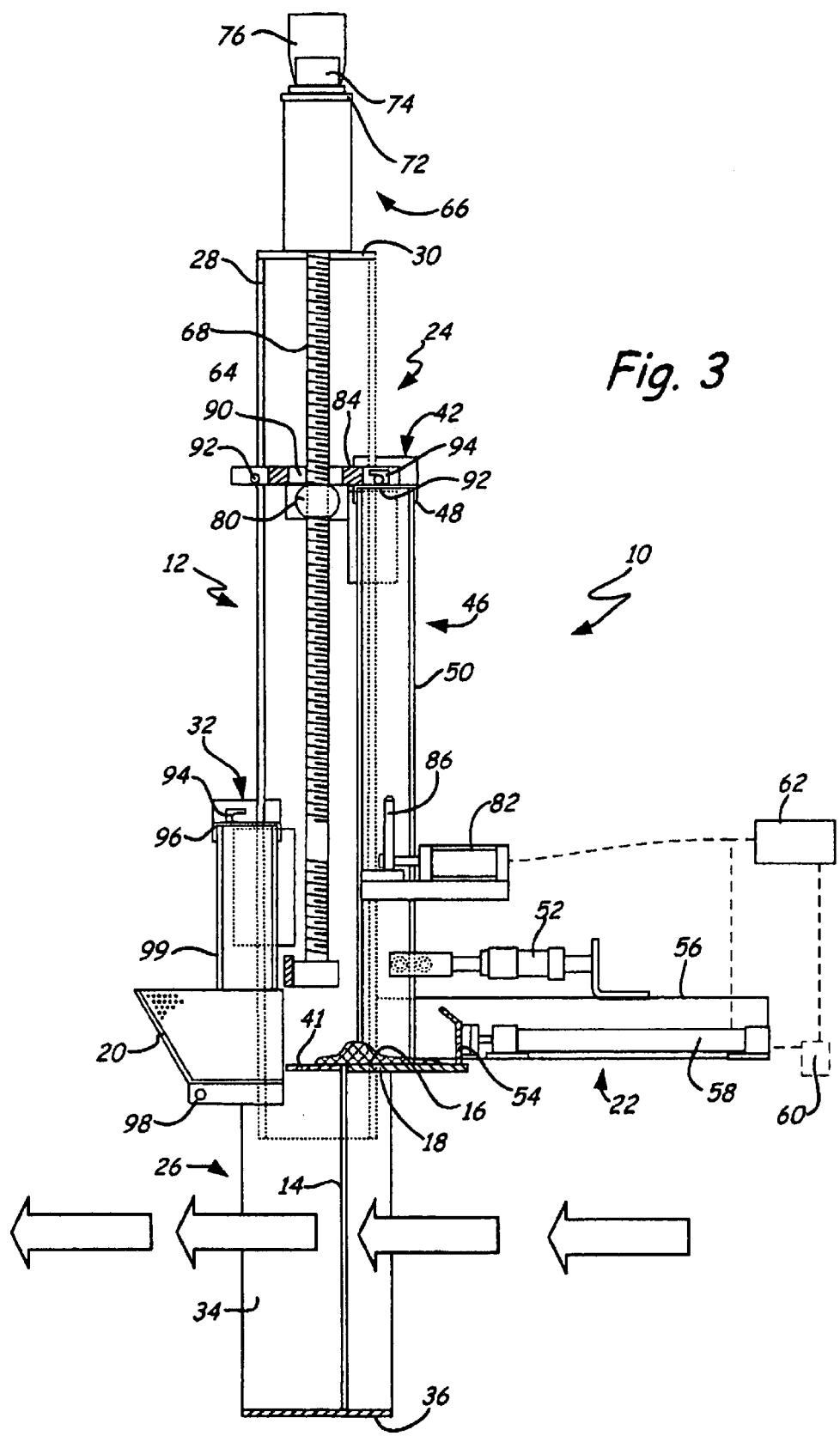
FIG. 3 is a cross-sectional view of the debris removal system of the present invention taken along lines A—A in FIG. 1.
Figure 4:
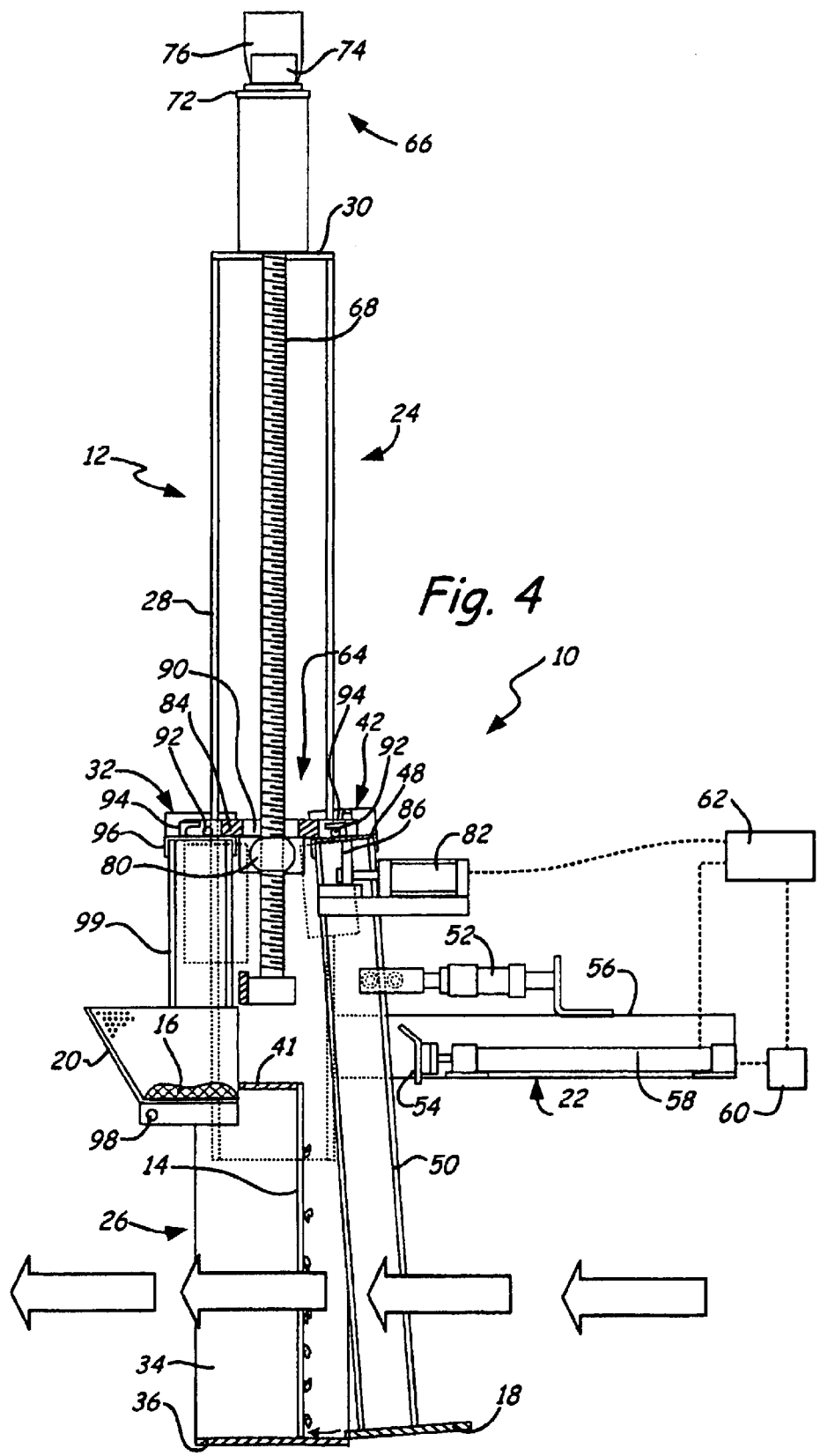
FIG. 4 is a cross-sectional view of the debris removal system of the present invention taken along lines A—A in FIG. 1.

The rake 18 attaches to the support frame 12 by means of the rake carriage 42 which slidably engages the channel members 28. The rake carriage 42 is positionable between a home position 44, as illustrated in FIG. 2, and a raised position 46, as illustrated in FIG. 3. The rake carriage 42 includes a cross-member 48 having downwardly extending legs 50 positioned at terminal ends. Opposing ends of each leg 50 attach to opposing terminal ends of the rake 18. Preferably, the legs 50 are pivotable such that the rake 18 can be brought out of contact with the bar screen 14 as illustrates in FIG. 4. A hydraulic cylinder 52 attaches to either leg 50 to position the rake 18 into or out of contact with the bar screen 14 by urging the leg 50 to pivot in a selected direction. On an upward raking stroke wherein the rake carriage 42 travels from the home position 44 to the raised position 46, the rake 18 is positioned to be in contact with the bar screen 14 so that it may remove the debris 16 collected thereon. At the end of the raking stroke wherein the rake carriage 42 is positioned at the raised position 46, the hydraulic cylinder 52 is activated, positioning the rake 18 out of engagement with the bar screen 14 and the carriage 42 is lowered back to a home position 44. This is done so that debris 16 accumulated on the bar screen 14 during the upward raking stroke after the rake 18 has passed is not pressed by an underside of the rake 18 on the downward return stroke. Upon reaching the home position 44, the hydraulic cylinder 52 is once again activated thereby positioning the rake 18 into engagement with the bar screen 14 and preparing the rake 18 for another upward raking stroke.

Figure 5:
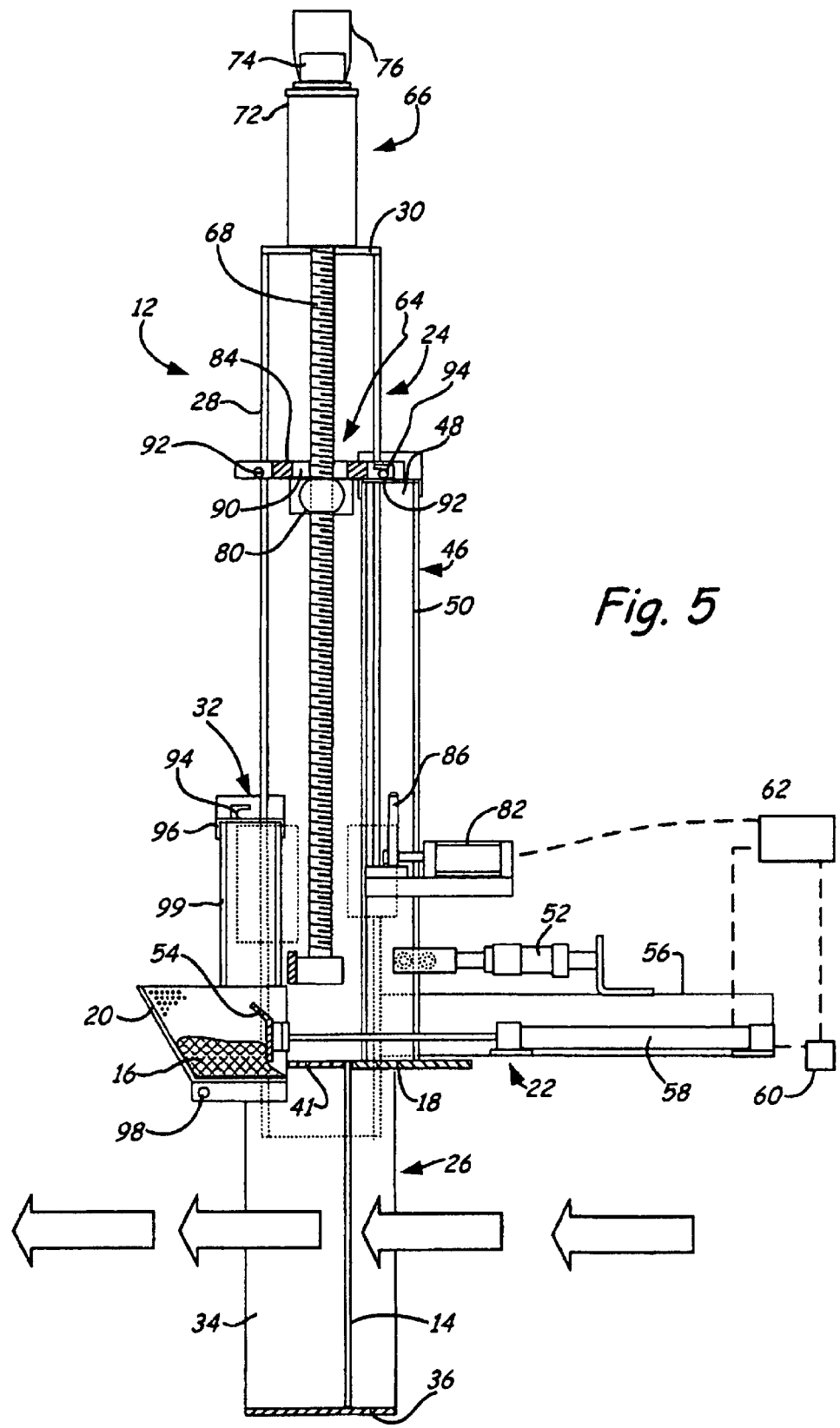
FIG. 5 is a cross-sectional view of the debris removal system of the present invention taken along lines A—A in FIG. 1.

To remove debris 16 and screenings carried upwardly by the rake 18 during a raking stroke, the plunging apparatus 22 is provided. The plunging apparatus 22 includes a push blade 54 supported by arms 56 attached to and extending away from the channel members 28. The push blade 54 is driven by a hydraulic cylinder 58 which positions the push blade 54 between a home position (FIG. 3) and a fully extended position as illustrated in FIG. 5. The push blade 54 pushes and compresses the debris 16 into the dump bucket 20. A sensor 60 connected to the cylinder 58 monitors the force needed to push and compress the debris 16 into the bucket. The sensor is also connected to a Program Logic Controller (PLC) 62 which monitors the force exerted by the push blade 54.

Figure 6:
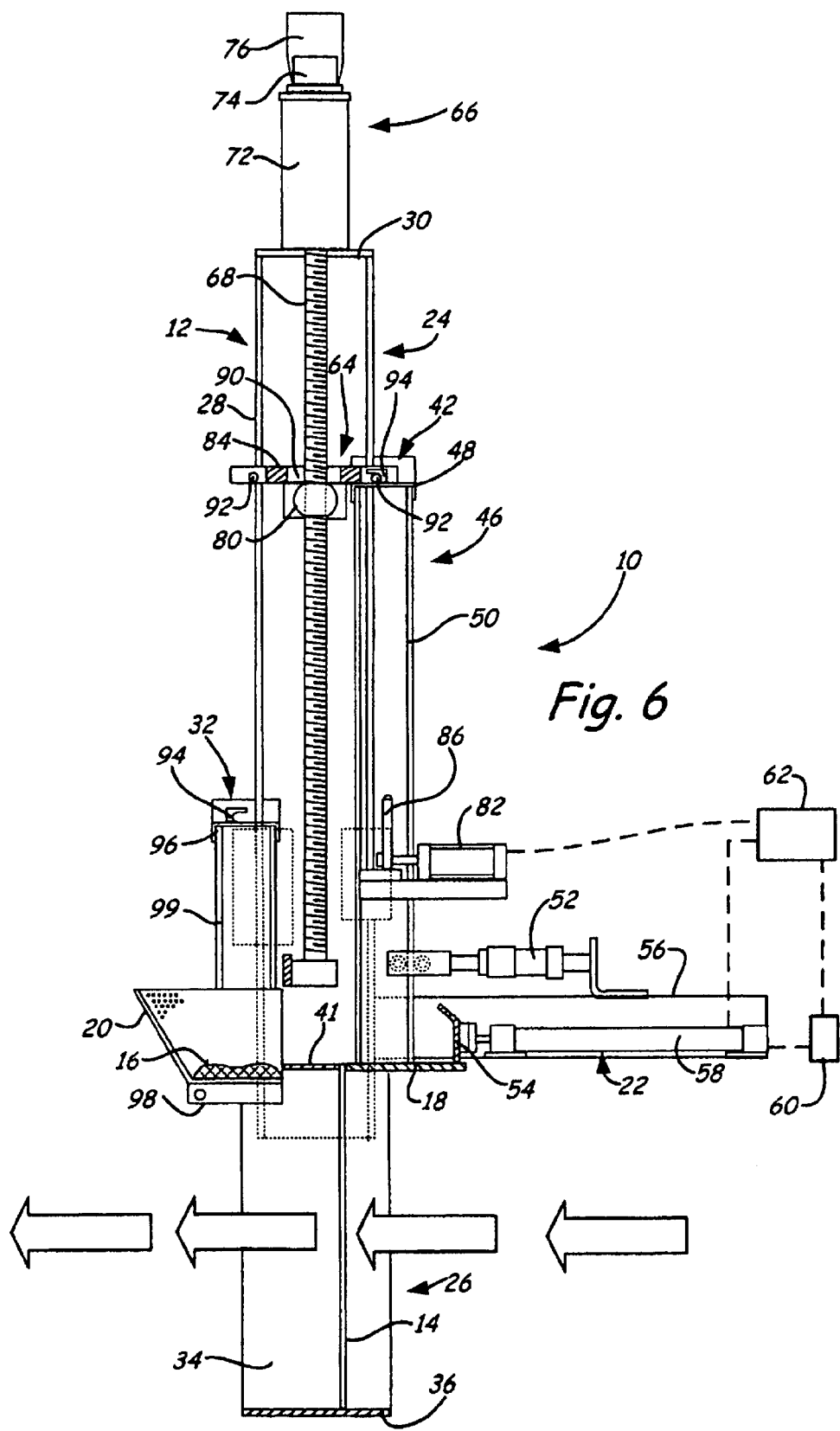
FIG. 6 is a cross-sectional view of the debris removal system of the present invention taken along lines A—A in FIG. 1.

As the rake 18 approaches the discharge location during its upward raking stroke, the hydraulic cylinder 58 is activated to extend the push blade 54 toward the rake 18. At the top of the upward stroke of the rake 18, the push blade 54 pushes the debris 16 from the dead plate 41 resulting in the debris 16 being deposited into the dump bucket 20. The dump bucket 20 is preferably perforated to allow excess water to sieve through, as the push blade 54 continues to travel partially within the bucket 20 to compress the debris 16 therein. Upon reaching the fully extended position, the hydraulic cylinder 58 is reversed and the push blade 54 is brought back to the home position, as illustrated in FIG. 6. Nozzles (not shown) may be attached to the push blade 54 which when activated are capable of washing either the rake 18, the dump bucket 20, the screenings 16 or any combination thereof. The raking cycle then repeats by returning the rake carriage 42 to the home position (FIG. 4) and positioning the rake 18 into contact with the bar screen 14 (FIG. 2) in preparedness for upward travel to remove debris 16 retained upon the bar screen 14.

Figure 7:
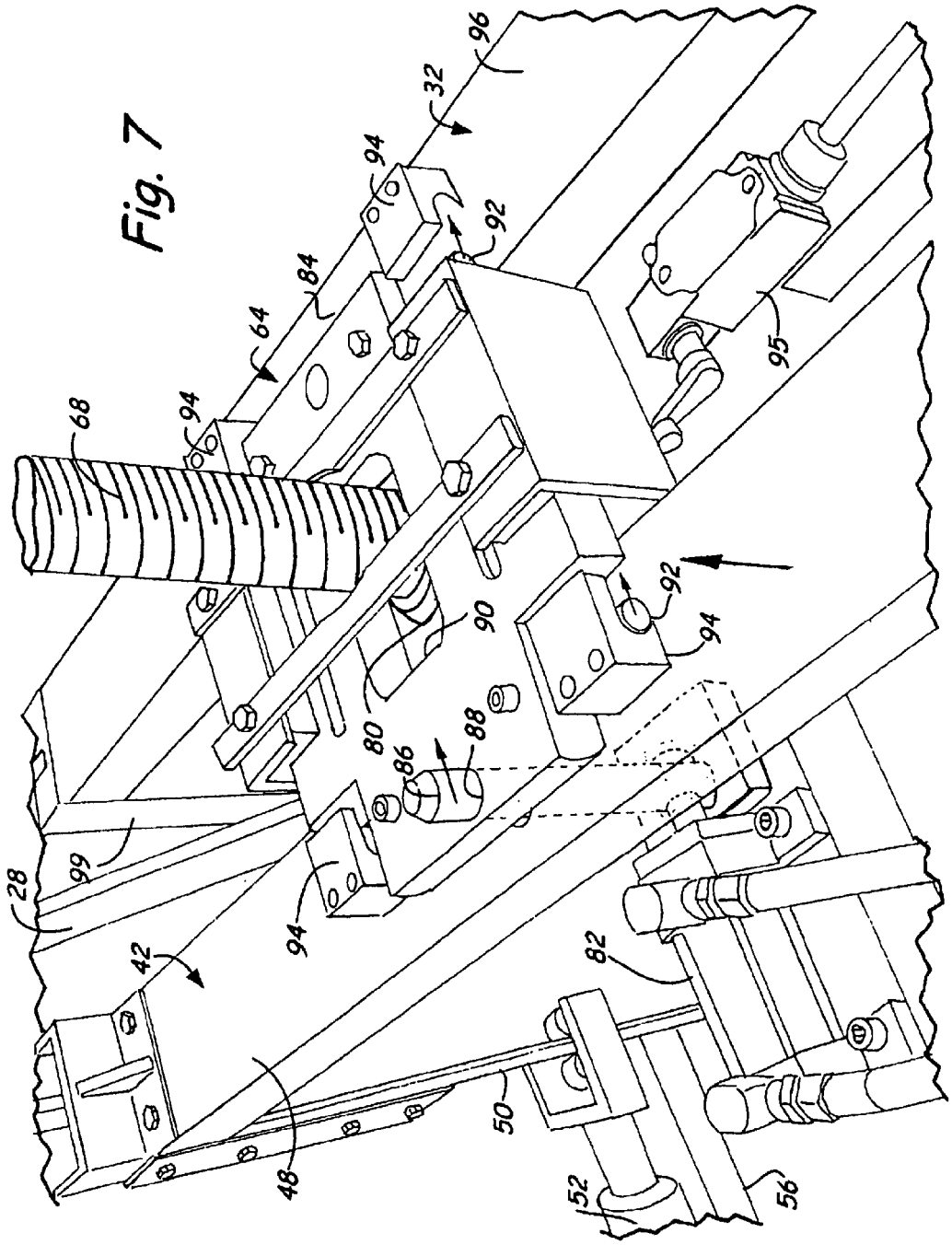
FIG. 7 is a partial perspective view of a transfer mechanism engaged to a dump carriage of the present invention.
Figure 8:
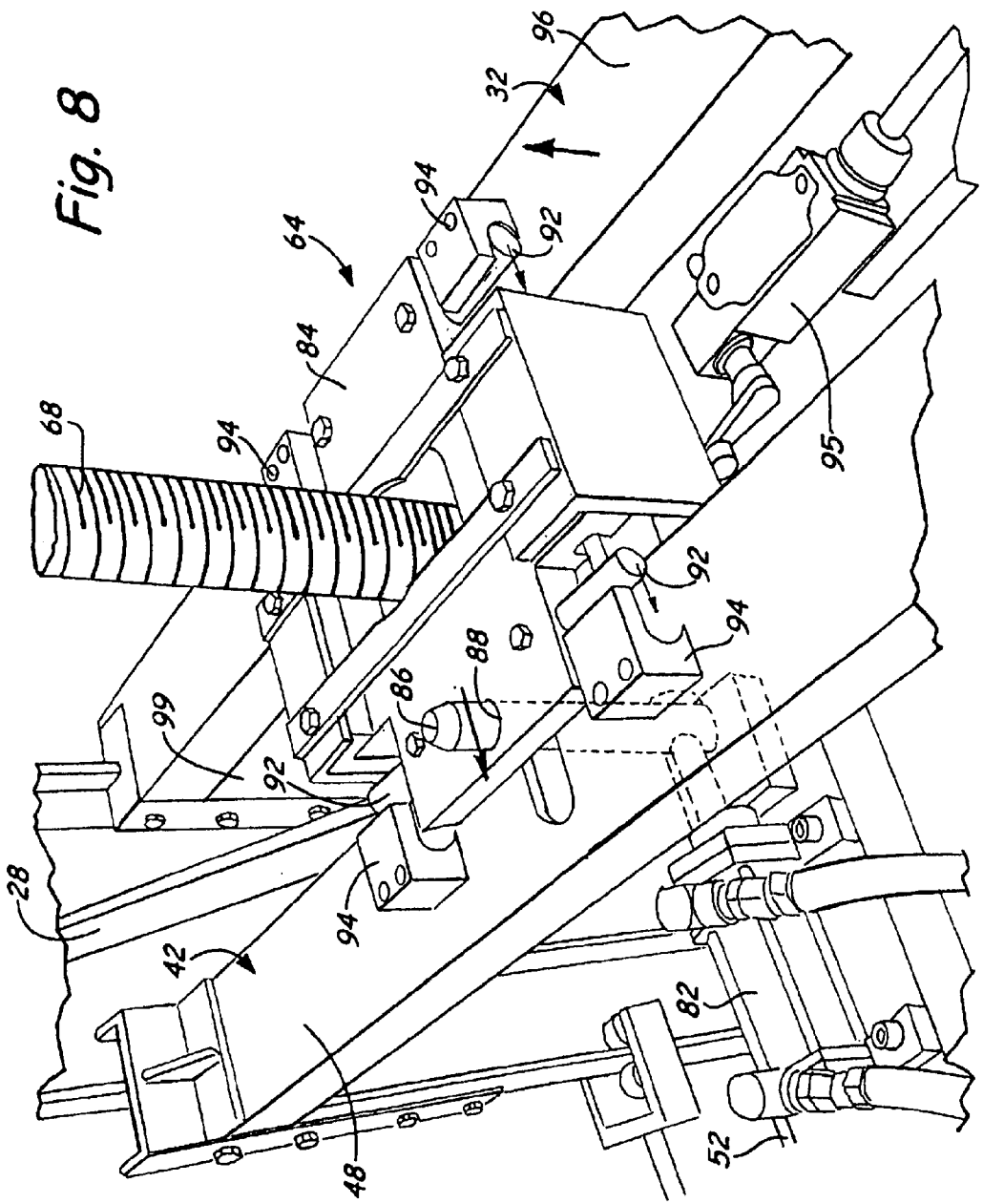
FIG. 8 is a partial perspective view of the transfer mechanism engaged to a rake carriage of the present invention.

Upon the dump bucket 20 being sufficiently filled with debris 16, typically after several raking cycles, the force needed to extend the push blade 54 into the bucket 20 becomes too great and the PLC 62 attached to the pressure sensor 60 activates a transfer mechanism 64. The transfer mechanism 64, as illustrated in FIGS. 7 and 8, allows for interchangeable connection of a drive mechanism 66 between the rake carriage 42 and the dump carriage 32. The drive mechanism 66 includes a ball screw drive 68 rotatably supported at an upper end by a bearing 70 mounted on a bracket 72 attached to the cross brace 30 of the upper portion 24 of the support frame 12. For driving the ball screw drive 68, the upper end thereof is connected by a coupler 74 to a hydraulic motor 76 mounted upon the bracket 72. The ball screw drive 68 operatively engages a ball nut 80. The ball nut 80 is adapted for slidable engagement with the transfer mechanism 64 to interchangeably couple the drive mechanism 66 to either the rake carriage 42 or the dump carriage 32.

The transfer mechanism 64 includes a hydraulic cylinder 82 operably connected to a transfer slide 84 by means of an attaching rod 86. The attaching rod 86 disposes within an aperture 88 located within the transfer slide 84 to operably connect the hydraulic cylinder 82 to the transfer slide 84. The transfer slide 84 encases the ball nut 80 within a slotted cavity 90 which permits translational movement of the transfer slide 84 about the ball nut 80. The transfer slide 84 thus continually engages the ball screw drive 68, and can be alternately coupled to either the rake carriage 42 or the dump carriage 32. To alternately couple the transfer slide 84 to either the rake carriage 42 or dump carriage 32, the transfer mechanism 64 further includes mateable pins 92 and receiving members 94.

The mateable pins 92 extend from the transfer slide 84 while the receiving members 94 attach to the rake carriage 42 and the dump carriage 32. Preferably, each receiving member 94 is substantially C-shaped to receive the respective pins 92 extending from the transfer slide 84. When the pins 92 adjacent the rake carriage 42 are disposed within and engage to the receiving members 94 of the rake carriage 42, the transfer slide 84, and thus the ball screw drive 68, is coupled to the rake carriage 42. Upon urging the transfer slide 84 toward the dump carriage 32, pins 92 of the transfer slide 84 adjacent the rake carriage 42 disengage from the receiving members 94 attached to the rake carriage 42 and the pins 92 of the transfer slide 84 adjacent the dump carriage 32 dispose within and engage the receiving members 94 of the dump carriage 32, thereby coupling the transfer slide 84, and thus the ball screw drive 68, to the dump carriage 32. It should be noted, however, that it is well within the scope of the present invention to interchange the positions of the receiving members 94 and pins 92 to accomplish engagement and coupling of the transfer slide 84 to either carriage 32 or 42. Coupling and decoupling of the transfer mechanism 64 can be accomplished only when both the rake carriage 42 and the dump carriage 32 are positioned at their respective home positions. The home position of the dump carriage 32 includes the bucket 20 positioned for receiving debris 16 from the rake 18.

During the raking cycle, the transfer mechanism 64 engages the rake carriage 42 to couple the rake carriage 42 to the drive mechanism 66 whereby the rake 18 may be raised and lowered relative to the screen 14 with reciprocal movement. Operation of the hydraulic motor 76, and hence raising and lowering of the rake carriage 42, may be controlled by respective upper and lower movement limit switches 95, which are engageable with the transfer slide. Also, regardless whether the transfer mechanism 64 is engaged to the rake carriage 42 or the dump carriage 32, raising of the transfer mechanism 64 disengages the attaching rod 86 from the transfer plate 84. The attaching rod 86 is only capable of horizontal movement, and not vertical movement, and thus can only be positioned when disposed within the aperture 88 of the transfer plate 84.

Figure 9:
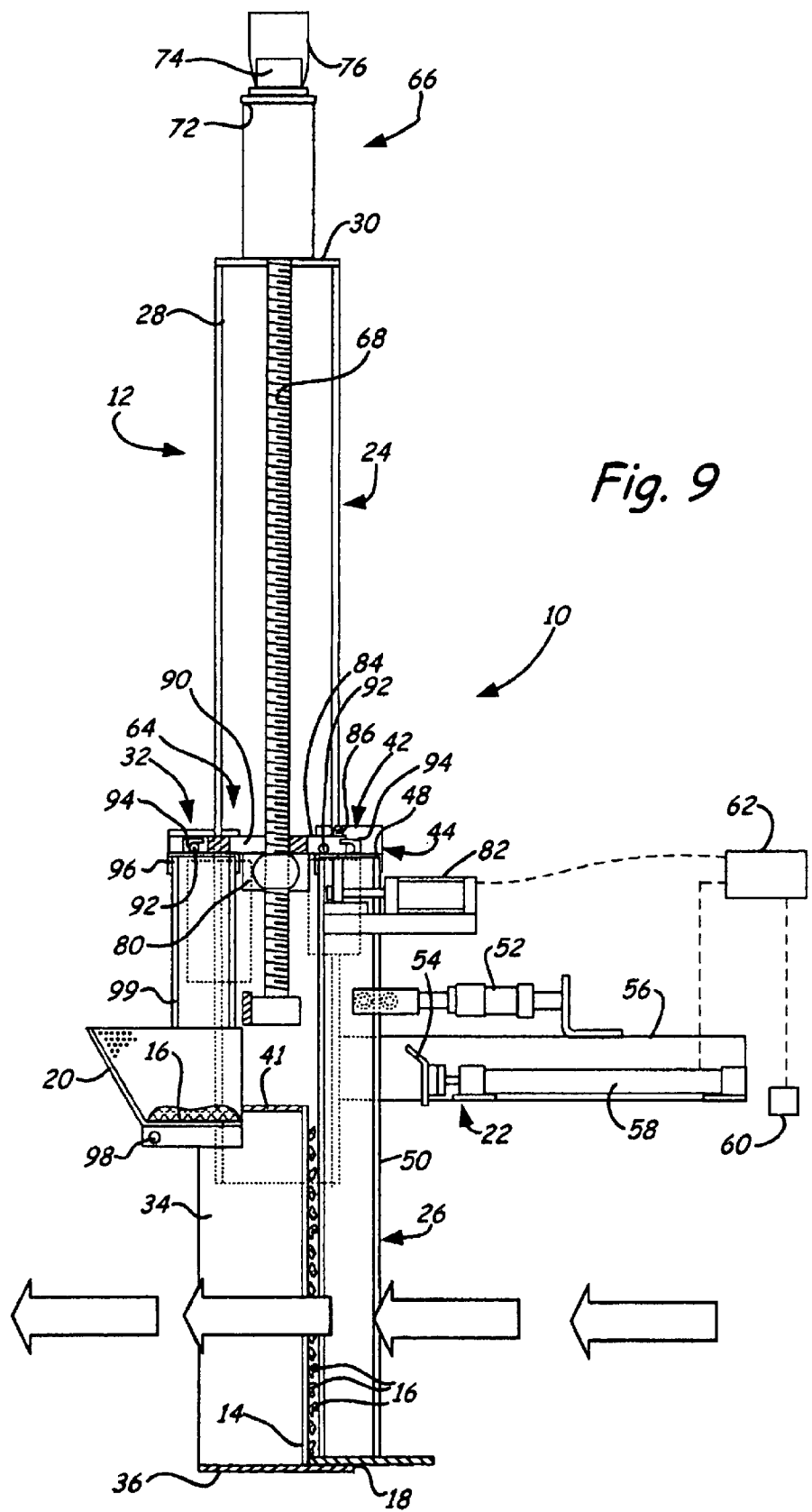
FIG. 9 is a cross-sectional view of the debris removal system of the present invention taken along lines A—A in FIG. 1.

As described, upon the dump bucket 20 being sufficiently filled with debris 16, the force needed to extend the push blade 54 into the bucket 20 becomes too great and the PLC 62 attached to the pressure sensor 60 activates the transfer mechanism 64 upon the rake carriage 42 returning to the home position 44. The PLC 62 activates the hydraulic cylinder 82 operably connected to the transfer slide 84 whereby the transfer slide 84 disengages from the rake carriage 42 and engages to the dump carriage 32 as illustrated in FIG. 9. Upon completion of the coupling, the ball screw drive 68 may then be activated to initiate the dump cycle to position the dump carriage 32 to empty the bucket 20.

Figure 10:
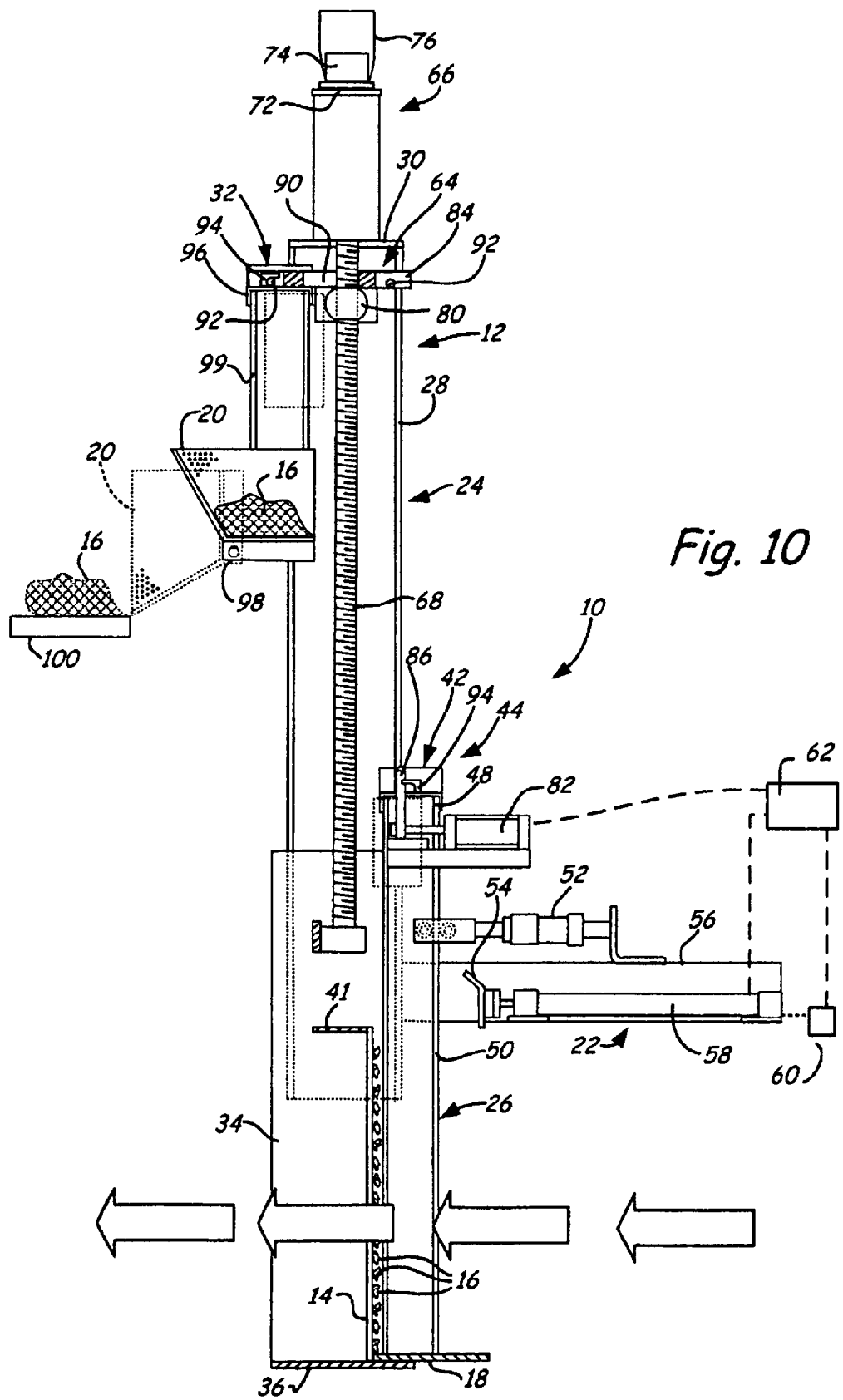
FIG. 10 is a cross-sectional view of the debris removal system of the present invention taken along lines A—A in FIG. 1.

Attachment of the bucket 20 to the dump carriage 32, along with the dumping cycle of the bucket 20, is essentially similar to that fully described in U.S. application Ser. No. 10/271,354, Publication No. 2003/0089088, which is hereby incorporated herein by reference. The dump carriage 32 includes an upper member 96 and a lower member 98 joined at terminal ends by first and second vertical members 99. The dump bucket 20 pivotally attaches to the lower member 98 and is disposed between the first and second vertical members 99. Upon raising the dump carriage 32 to a selected height, the dump bucket 20 is permitted to rotate from a resting position to a fully dumped position as illustrated in FIG. 10.

Initiation of the entire cleaning cycle begins with the rake carriage 42, the dump carriage 32 and the plunger 54 at their respective home positions. When the dump carriage 32 is at the home position, the dump bucket 20 rests upon the lower member 98, and is in position for receiving debris from the rake 18 during the raking cycle. Operation of the plunger 54 coincides with the raking cycle to push the debris 16 from the raised rake 18 into the dump bucket 20. As mentioned, the dump bucket 20 is preferably perforated such that the plunger 54 can compress the debris 16, and excess water is permitted to sieve through the dump bucket 20. During the raking cycle, the drive mechanism 66 is coupled to the rake carriage 42 (FIG. 7) to raise and lower the rake 18.

Upon the dump bucket 20 being filled to capacity, which is monitored by the PLC 62, the transfer slide 84 disengages from the rake carriage 42 while at its home position and couples to the dump carriage 32 to begin the dump cycle (FIG. 8). The dump cycle begins with the PLC 62 activating the ball drive mechanism 66 to raise the dump carriage 32. At the raised discharge station, the bucket 20 is dumped as described in U.S. application Ser. No. 10/271,354, and the debris is deposited on a conveyor 100 or within another bin for further removal.

Upon dumping, the drive mechanism 66 is reversed and the dump carriage 32 travels downward to the home position to complete the dump cycle. When the dump carriage 32 travels back to the home position, the hydraulic cylinder 82 urges the transfer slide 84 to disengage from the dump carriage 32 and couple to the rake carriage 42. The raking cycle may then be repeated, whereby debris 16 is collected from the bar screen 14 by the rake 18 and deposited within the dump bucket 20 by way of the hydraulically controlled plunger 54.

Although the present invention has been described with reference to preferred embodiments, workers skilled in the art will recognize that changes may be made in form and detail without departing from the spirit and scope of the invention.

What is claimed is:

1. An automatic screening apparatus for removing debris from a liquid stream, the screening apparatus comprising:
    a support frame;
    a screen connected to the support frame to retain the debris from the stream;
    a first carriage assembly moveably engaged to the support frame, the first carriage assembly including a rake attached thereto to collect debris retained on the screen;
    a second carriage assembly moveably engaged to the support frame, the second carnage assembly including a bucket pivotally mounted thereon for transporting debris received from the rake; and
    a drive mechanism mounted to the support frame for moving the first and second carnage assemblies, wherein the drive mechanism interchangeably couples to either the first carriage assembly or the second carriage assembly to move the respective assembly.

2. The screening apparatus of claim 1 and further comprising a transfer mechanism to interchangeably couple the drive mechanism to either the first or second carriage assembly.

3. The screening apparatus of claim 2 wherein the transfer mechanism includes a positionable plate operably connected to the drive mechanism, wherein the plate is slidably engageable to either the first carriage assembly or the second carriage assembly to couple the drive mechanism to the respective carriage assembly when engaged thereto.

4. The screening apparatus of claim 3 wherein the transfer mechanism further includes a hydraulic cylinder connected to the positionable plate to urge the positionable plate into engagement with either the first or second carriage assembly.

5. The screening apparatus of claim 1 and further comprising a plunging assembly to direct debris collected from the rake into the bucket.

6. The screening apparatus of claim 5 wherein the plunging assembly comprises a plunger movable between a home position and an extended position, whereupon in moving the plunger from the home position toward the extended position, the plunger directs debris collected from the rake into the bucket.

7. The screening apparatus of claim 6 wherein the plunging assembly further comprises a hydraulic cylinder to urge the plunger between the home position and the extended position.

8. The screening apparatus of claim 6 when the plunger is positioned within the bucket while at the extended position.

9. An automatic, self-relieving screening apparatus for cleaning a debris-laden stream, the automatic screening apparatus comprising:
    a screen for collecting the debris in the stream;
    a rake moveable relative to the screen for removing debris held by the screen;
    a temporary storage structure which receives debris from the rake; and
    a drive mechanism interchangeably coupled to either the rake or the temporary storage structure, the drive mechanism operable to selectively move the rake and remove debris from the temporary storage structure wherein the drive mechanism interchangeably couples to either the rake or the temporary storage structure by a transfer mechanism, the transfer mechanism including a slide plate operably engaged to the drive mechanism, wherein the slide plate is moveable to either engage the rake to couple the rake to the drive mechanism or engage the temporary storage structure to couple the temporary storage structure to the drive mechanism.

10. The automatic screening apparatus of claim 9 wherein the transfer mechanism further includes a hydraulic cylinder to urge the slide plate into engagement with either the rake or the temporary storage structure.

11. The automatic screening apparatus of claim 9 wherein the drive mechanism comprises:

a ball screw drive; and a nut cooperably engaged to the ball screw drive, wherein the nut connects to the transfer mechanism.

12. An automatic, self-relieving screening apparatus for cleaning a debris-laden stream, the automatic screening apparatus comprising:

a screen for collecting the debris in the stream;

a rake moveable relative to the screen for removing debris held by the screen;

a temporary storage structure which receives debris from the rake;

a drive mechanism interchangeably coupled to either the rake or the temporary storage structure, the drive mechanism operable to selectively position either the rake or the temporary storage structure; and a plunger attached to the support frame for directing debris from the rake into the temporary storage structure.

13. The automatic screening apparatus of claim 12 wherein the plunger is moveable between a home position and an extended position, wherein the plunger directs the debris from the rake into the temporary storage structure while traveling from the home position toward the extended position.

14. The automatic screening apparatus of claim 13 and further comprising a sensor to monitor the force exerted by the plunger while traveling toward the extended position, whereupon encountering a selected maximum force, the transfer slide decouples from the rake and couples to the temporary storage structure, whereby the drive mechanism positions the temporary storage structure to dump the debris held therein.

15. The automatic screening apparatus of claim 12 wherein the plunger is positionable within the temporary storage structure to compress debris held therein.

16. A method of automatically removing debris from a contaminated flowing liquid comprising:

positioning a screen in contact with the flowing liquid;

activating a drive mechanism to move a rake across the screen to remove debris retained on the screen;

activating a plunger to direct the debris from the rake into a bucket;

coupling the drive mechanism to the bucket; and activating the drive mechanism to dump the bucket.

17. The method of claim 16 and further comprising sensing when the bucket is full.

18. A method of automatically removing debris from a contaminated flowing liquid comprising:

positioning a screen in contact with the flowing liquid;

activating a drive mechanism to move a rake across the screen to remove debris retained on the screen;

directing the debris from the rake into a bucket;

coupling the drive mechanism to the bucket by positioning a transfer plate to disengage the rake and engage the bucket; and activating the drive mechanism to dump the bucket.

* * * * *

UNITED STATES PATENT AND TRADEMARK OFFICE
CERTIFICATE OF CORRECTION

PATENT NO.   : 6,896,820 B2
DATED        : May 24, 2005
INVENTOR(S)  : Mattox

It is certified that error appears in the above-identified patent and that said Letters Patent is hereby corrected as shown below:

Column 3,
Line 10, delete "illustrates", replace with -- illustrated --.

Column 6,
Line 11, delete "carnage", replace with -- carriage --.

Signed and Sealed this

Twenty-seventh Day of September, 2005

JON W. DUDAS
*Director of the United States Patent and Trademark Office*